(12) United States Patent
Thibodeau et al.

(10) Patent No.: US 7,797,785 B2
(45) Date of Patent: Sep. 21, 2010

(54) WINDSHIELD WASHER SYSTEM

(75) Inventors: Harold B. Thibodeau, Troy, MI (US);
James M. Burcar, Rochester, MI (US);
David K. Novack, Oxford, MI (US)

(73) Assignee: Chrysler Group LLC, Auburn Hills, MT (US)

( * ) Notice: Subject to any disclaimer, the term of this patent is extended or adjusted under 35 U.S.C. 154(b) by 1203 days.

(21) Appl. No.: 11/399,185

(22) Filed: Apr. 6, 2006

(65) Prior Publication Data
US 2007/0234499 A1    Oct. 11, 2007

(51) Int. Cl.
*B60S 1/46*    (2006.01)
*B60S 1/08*    (2006.01)

(52) U.S. Cl. ............ 15/250.02; 318/443; 318/466; 318/DIG. 2; 239/284.1

(58) Field of Classification Search ........... 15/250.12, 15/250.01, 250.02; 239/284.1; 318/DIG. 2, 318/444, 443, 483, 466
See application file for complete search history.

(56) References Cited

U.S. PATENT DOCUMENTS

| 3,783,700 | A | * | 1/1974 | Kuck ........................ 74/55 |
| 4,393,341 | A | * | 7/1983 | Byrne ...................... 318/443 |
| 4,768,716 | A | * | 9/1988 | Buchanan et al. ........ 239/284.1 |
| 5,170,107 | A | * | 12/1992 | Araki ....................... 318/443 |
| 5,944,910 | A | * | 8/1999 | Fujii ........................... 134/6 |
| 5,965,950 | A | * | 10/1999 | Park ....................... 307/10.1 |
| 6,236,180 | B1 | * | 5/2001 | Contos et al. ............ 318/444 |
| 2005/0076462 | A1 | * | 4/2005 | Turner et al. ........... 15/250.01 |

FOREIGN PATENT DOCUMENTS

EP    0850811    *    7/1998

* cited by examiner

*Primary Examiner*—Gary K Graham
(74) *Attorney, Agent, or Firm*—Ralph E. Smith

(57) ABSTRACT

A windshield washer control system comprising a wiper device; a motor connected to the wiper device, the motor being in operative connection with a controller, the controller including a timer; a pump selectively operated by the controller; and a sprayer for dispensing fluid.

13 Claims, 5 Drawing Sheets

WINDSHIELD WASHER SYSTEM

TECHNICAL FIELD

The present invention generally relates to a windshield washer system and in particular to a controllable windshield washer system.

BACKGROUND

Windshield washer systems are typically actuated either manually or by automatic control. To activate a washer system in manual mode, an operator generally turns on, or activates, the system manually. However, manual activation and control of the washing system may not always be convenient or desirable.

For additional convenience, some windshield washing systems incorporate an automatic mode. Such systems sometimes further include a form of windshield transparency detection system to determine the transparency or operative visual clarity of the windshield. The resulting feedback from such a detection system may be used to, among other things, determine if the windshield should be washed or "cleaned" by the washer system.

If the transparency of the windshield is low, a windshield transparency detection system can be used to initiate the application of wiper fluid to the windshield and the operation of wiper blades to clean the windshield.

However, conventional windshield washer control systems may not provide the necessary or desired amount of windshield wiper fluid, or cycles of the windshield wiper blades, to clean the windshield.

SUMMARY

A windshield washer control system comprising a wiper device; a motor connected to the wiper device, the motor being in operative connection with a controller, the controller including a timer; a pump selectively operated by the controller; and a sprayer for dispensing fluid.

DETAILED DESCRIPTION

Figure 1:
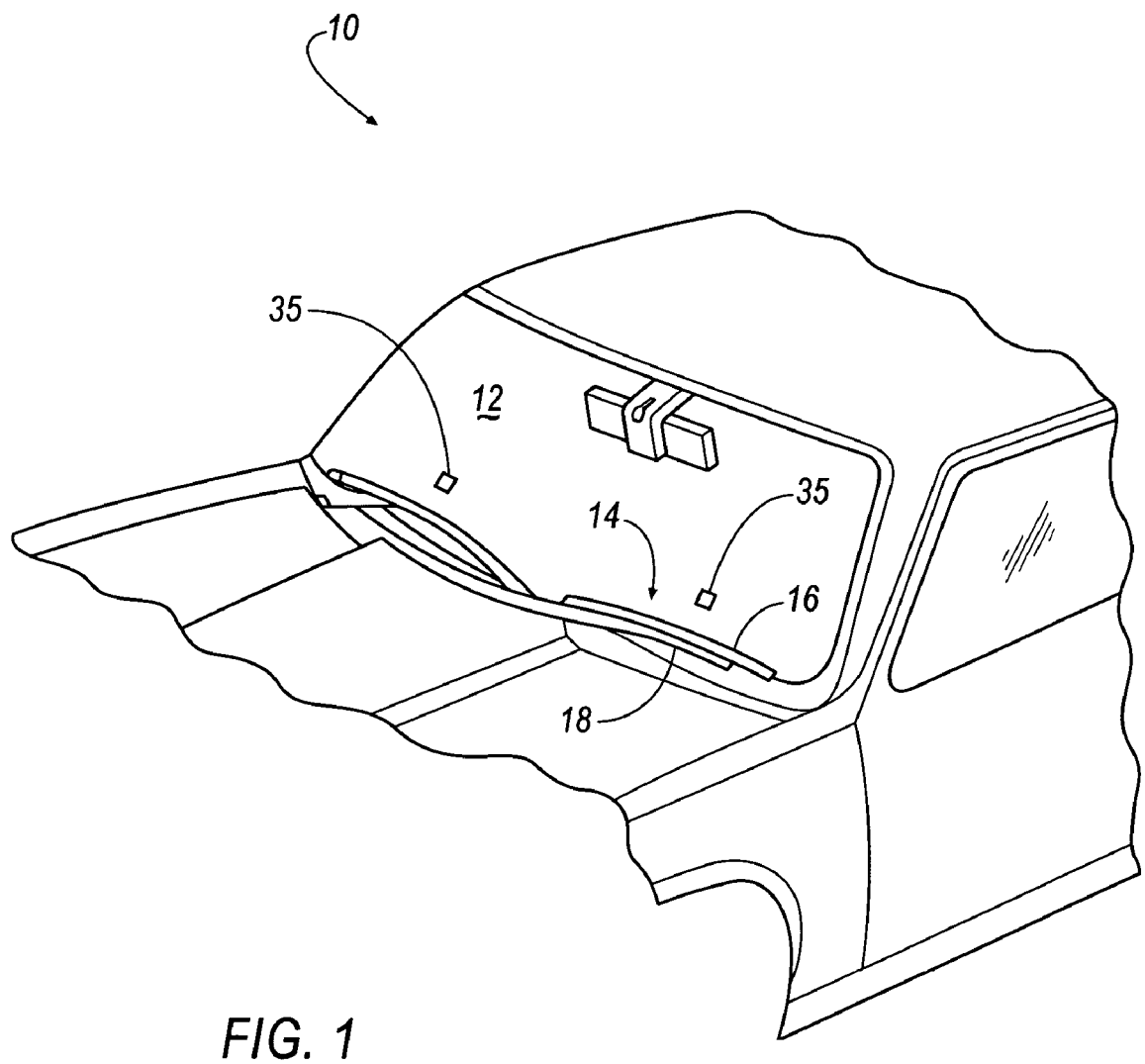
FIG. 1 is a partial perspective view of a vehicle including a windshield and a windshield wiper device according to an embodiment of the invention.

Referring to FIG. 1, a partial view of a vehicle 10 including a windshield 12 is generally shown. A wiper device, generally designated 14, is shown positioned proximate the windshield 12. The wiper device 14 may, as illustrated, include a wiper blade 16 that is supported by a wiper arm 18.

Figure 2:
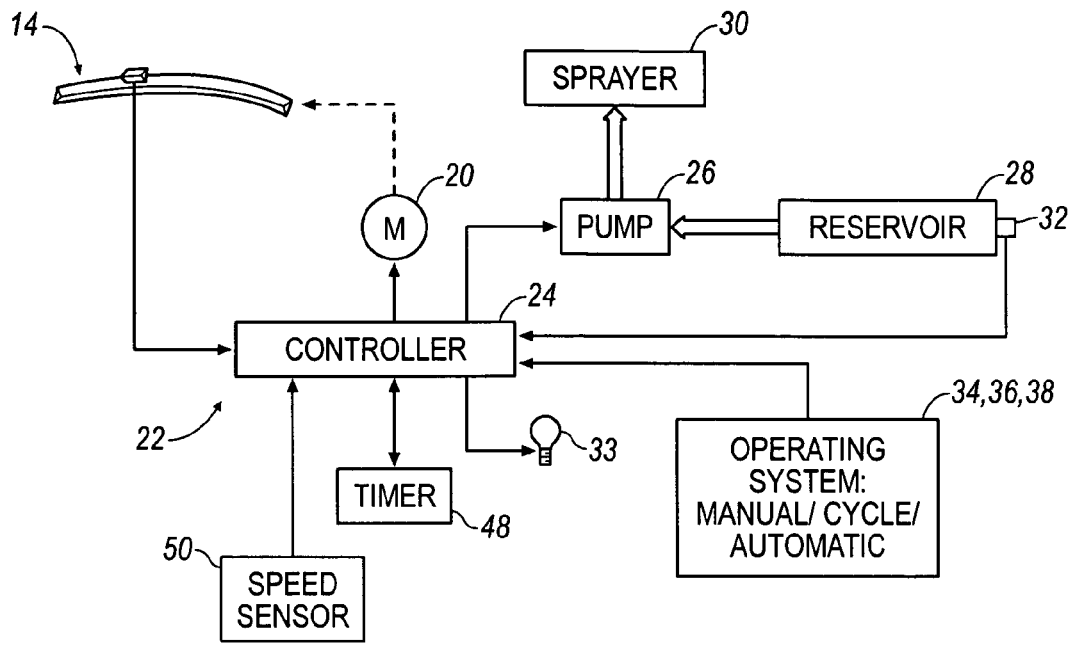
FIG. 2 is a schematic view of a windshield washer control system according to an embodiment of the invention.

Turning to the schematic of an embodiment of the system shown in FIG. 2, the wiper device 14 can be driven or otherwise controlled by a motor 20, which may be connected to the wiper device 14 and operated by a wiper control system 22. However, it is important to note that the invention is not limited to the illustrated embodiment, and may be practiced with a plurality of wiper devices and further may embody various other systematic configurations and structural forms. For example, the embodiment shown in FIG. 1 includes two sets of wiper devices, one for a driver's side of the windshield 12 and one for the passenger's side of the windshield 12. However, without limitation, it can be further appreciated that the invention may be practiced in connection with a single wiper device on a front windshield or with additional wiper devices, including, for instance, one or more wiper devices associated with the rear window, side window(s), or other portions of a vehicle.

In an embodiment, the wiper control system 22 includes a controller 24 for controlling the dispensing (which may include the emission or other release or dispersion) of washer fluid. The controller 24 may operate a pump 26 which may draw washer fluid from a washer fluid reservoir 28 and deliver fluid to a release opening, dispersing component, or a sprayer 30 (collectively referred to as a "sprayer").

As shown in the schematic of FIG. 2, a fluid level sensor (generally designated as element 32) can be employed in connection with the fluid reservoir 28. If desired, the fluid level sensor 32 may be activated upon the washer fluid falling at or below a designated level. Moreover, the fluid level sensor 32 may selectively signal controller 24 to illuminate a "low washer fluid" signal or light 33, which can be located within an operator's viewing area, for example, on an instrument panel.

Figure 3:
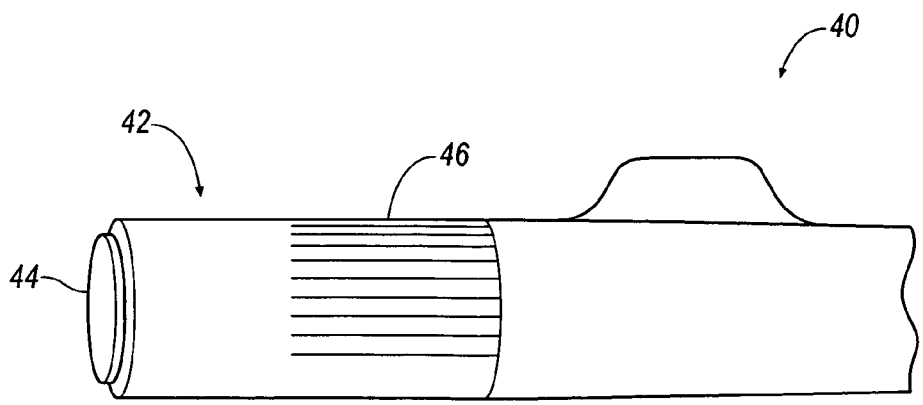
FIG. 3 is a perspective view of a portion of a switch device of a windshield washer control system according to an embodiment of the invention.

An embodiment of a switch device 40 that may be used to initiate various operational modes associated with the wiper control system 22 is shown in FIG. 3. The operational modes may include a manual mode 34, a cycle mode 36, and/or an automatic mode 38. However, it is important to note that the illustrated switch device is exemplary, and the invention is not limited to the illustrated embodiment. As such, the switch device may take on various other structural or mechanical configurations. For example, without limitation, the switch device may take the form of one or more buttons, switches, and/or other actuation devices. Moreover, the switch device may be incorporated into or included in connection with various levers, instrument panels, or steering wheels, as would be apparent to one of skill in the art.

Switch device 40 allows an operator to select an operating mode associated with the washer control system 22. If desired, the switch device 40 may include a rotary switch, such as illustrated rotary switch 42, which can readily permit the implementation of manual and cycle operating modes 34, 36. Additionally, the switch device 40 can further include a means for activating an automatic mode. In an embodiment, the means for allowing an automatic mode may comprise a switch or a button, such as the illustrated push button 44. Further, switch device 40 may include a variable wiper delay feature, such as dial 46, to permit select or variable delay of movement of the wiper device 14.

Upon activation of the manual mode 34 by an operator (e.g., such as via angular movement of the switch 40, or rotation in a first direction of rotary switch 42), an input or signal may be sent to controller 24. The signal may activate motor 20, leading to an associated movement of wiper device 14. In addition to the input or signal sent to wiper device 14, controller 24 may selectively send a second input or signal to pump 26. As a result, pump 26 may pump or draw washer fluid from the fluid reservoir 28 for forwarding to sprayer 30 and dispensing onto the windshield 12 or other relevant surface.

In an exemplary embodiment, the switch 40 or the rotary switch 42 may be moved in a second direction to activate a plurality of settings for operation in cycle mode 36. For instance, using the rotary switch 42, the operator may choose the setting for the number of designated or predetermined wiper cycles associated with the cycle mode 36. In addition to the manual mode 34, cycle mode 36 may become activated following a designated or predetermined number of cycles for the wiper device 14 as set by the operator.

As previously noted, an intermittent wiper delay dial 46 may provide flexibility in setting time intervals between cycles of wiper device 14. Upon initiation of the cycle mode 36, the controller 24 may activate the motor 20 and pump 26 after completion of a designated or predetermined number of wiper cycles, or "n" number of cycles. The pump 26 draws fluid from the washer fluid reservoir 28, which is in turn transferred to sprayer 30, and is dispensed onto the windshield 12. Further, wiper device 14 is activated by motor 20 and results in movement of the wiper arm 18 and wiper blade 16.

As previously noted, a level sensor 32 may be utilized to detect the level of the windshield washer fluid. If the washer fluid level is at or below a designated or predetermined level, level sensor 32 may be activated. Once the level sensor 32 is activated, an input or signal can be sent to controller 24, which in turn may signal a "low washer fluid" signal or light 33 to become illuminated.

Further, upon receiving an associated "low-fluid" input or signal (in whatever form and from whatever source), the washer control system 22 may revert from operating in cycle mode 36 to manual mode 34 either automatically (such as by controller 24), or alternatively, by the operator so that the operator may conserve washer fluid by selectively activating the washer control system 22 on an as-needed or as-desired basis.

Another operating mode, an automatic mode 38, may be introduced or initiated in connection with the system, for example via a switch device. For example, with reference to the exemplary switch device 40 shown, a button 44 may be activated, or pressed, to initiate operation of an automatic mode 38. Following activation of the automatic mode 38, controller 24 may receive input or a signal from a sensor, such as sensor 35, which may be disposed on or about windshield 12 or wiper device 14. If desired, one or more sensors may be connected to a transmitter (not shown), which may be disposed on an instrument panel.

Figure 4A:
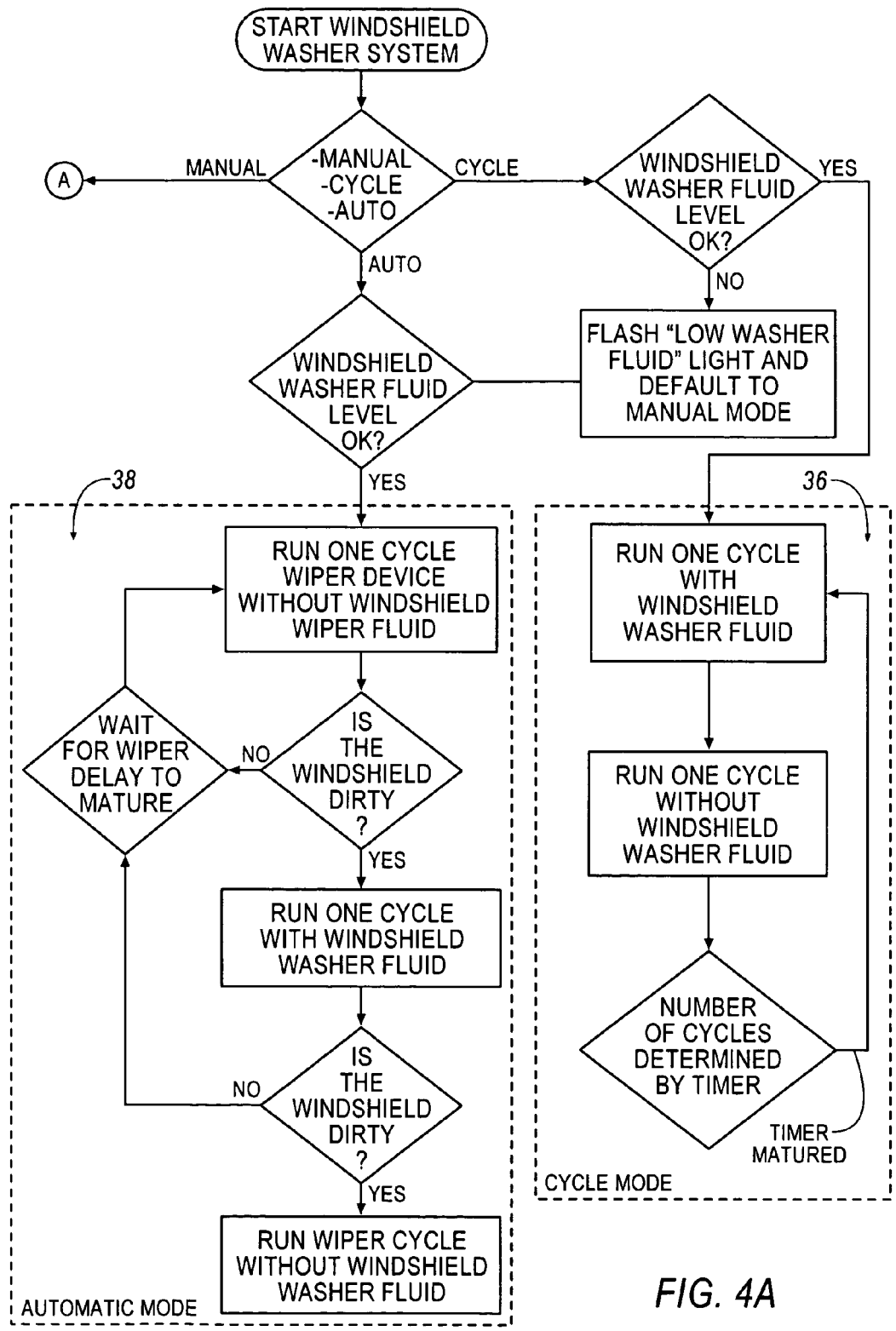
FIGS. 4A and 4B depict a functionality flow chart for windshield washer system according to an embodiment of the invention.
Figure 4B:
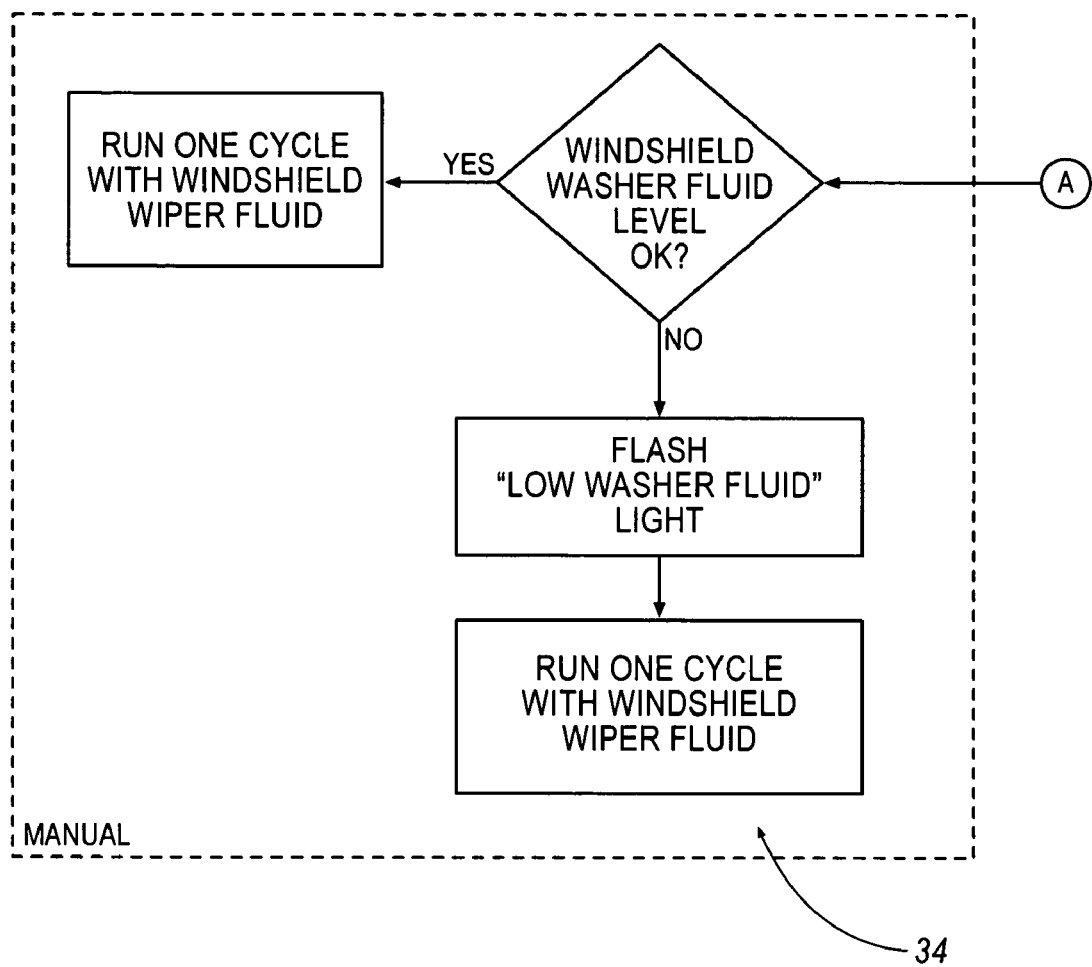

In an embodiment, once a select or predetermined level of transparency is reached with respect to the collection of dirt or debris upon windshield 12, the sensor 35 may send a signal or response to controller 24. Controller 24 may then send a signal to pump 26, which draws washer fluid from the washer fluid reservoir 28 into sprayer 30 and sprayer 30 may dispense (or refrain from dispensing, as the case may be) washer fluid onto windshield 12. Following activation of pump 26, controller 24 may also signal motor 20, causing (or impeding) the movement of wiper device 14. FIG. 4 illustrates a functional flow chart of various operating modes 34,36,38 of the windshield washer control system.

As with the cycle mode 36, a level sensor 32 may be utilized to detect the level of windshield washer fluid. If level sensor 32 detects a level of washer fluid lower than a select or predetermined level of washer fluid, a signal or response may be sent back to controller 24 to illuminate a "low washer fluid" signal or light 33 on the instrument panel. To conserve windshield washer fluid, controller 24 may be configured to automatically revert to manual operating mode 34 for the operator to selectively activate the washer system on an as-needed or as-desired basis.

Figure 5A:
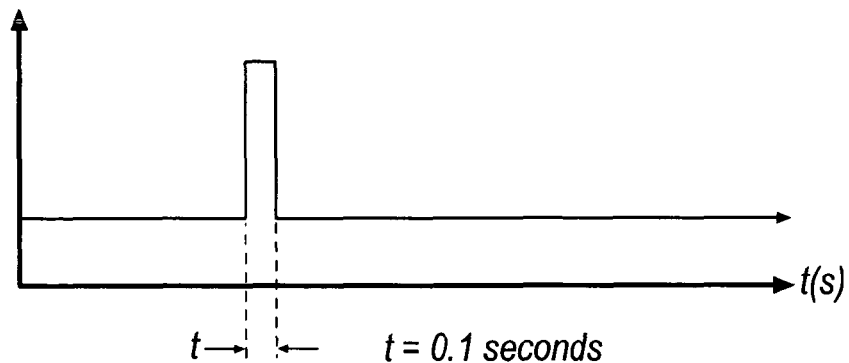
FIGS. 5A-5C illustrate sample activation patterns that may be associated with a timer.
Figure 5B:
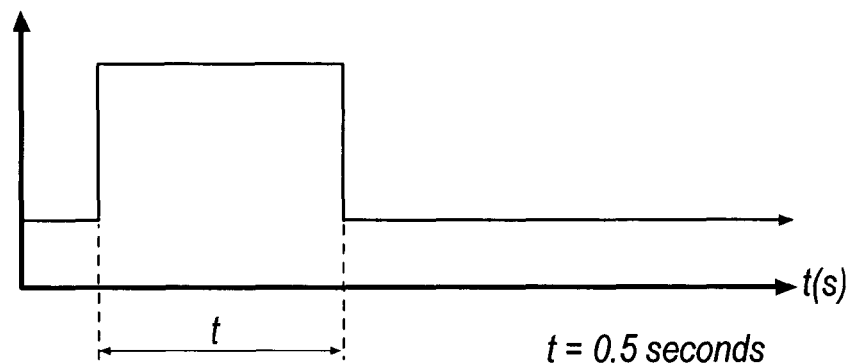
Figure 5C:
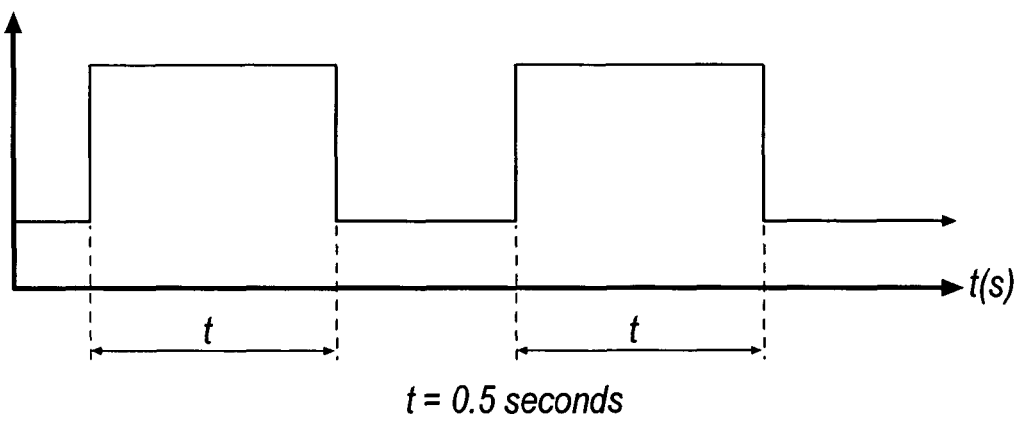

Controller 24 may further include a time-based mechanism, such as a timer 48, to determine or set the time in which motor 20 and/or pump 26 are activated. The timer 48 may be in communication with the controller 24 (such as illustrated) or, if desired, may be included within or be integrated into the controller. Further, timer 48 may be programmed to run pump 26 for a shortened, or an extended, period of time (t) to ensure adequate windshield washer fluid is dispensed onto windshield 12. Referring to FIGS. 5A-5C, various embodiments of timer 48 are illustrated. For example, timer 48 may be programmed to run pump 26 for a predetermined number of seconds, or timer 48 may be programmed to run pump 26 for a predetermined number of cycles associated with a wiper device 14. For example, FIG. 5B illustrates pump 26 running for a predetermined interval of time (i.e., t=0.5 seconds).

Additionally, timer 48 may be programmed to operate pump 26 for a variable amount of time depending upon which operating mode the windshield washer control system 22 is currently functioning under. In such a case, timer 48 may be set to run pump 26 for a first period of time when operating in manual mode 34; timer 48 may be set to run pump 26 for a second period of time when operating in cycle mode 36; and timer 48 may be set to run pump 26 for a third period of time when operating in automatic mode 38.

In another embodiment, timer 48 may be programmed to pulsate, or run in cycles, for an extended period of time. For instance, referring to FIG. 5C, timer 48 may be programmed to run pump 26 for intervals of time (i.e., t=0.5 seconds) for several cycles. It can be appreciated that while pump 26 is illustrated as running for t=0.5 seconds, the invention may be practiced with the pump 26 running for other lengths of time, and for other numbers of cycles.

It can further be appreciated that the speed of motor 20 may be varied. For example, by making the speed of motor dependent upon the position of switch device 40. For instance, when switch device 40 is set on high, motor 20 may rotate at a high speed. As a result, motor 20 may cause wiper device 14 to move at a high speed, or higher number of cycles per minute. Similarly, when switch device 40 is set on low, motor 20 may rotate at a low speed. As a result, motor 20 may cause wiper device 14 to move at a low speed. In other words, wiper blade 16 may be moved at variable speeds, as desired, depending upon the rotation speed of motor 20.

Likewise, the speed of pump 26 may be varied depending upon either the speed of motor 20, or the position of switch device 40. For instance, when motor 20 is rotating at a high speed, or switch device 40 is set on high, pump 26 may operate at a high speed. As a result, a greater amount of windshield washer fluid may be dispensed onto windshield 12. As well, when motor 20 is rotating at a low speed, or switch device 40 is set on low, pump 26 may operate at a lower speed. Thus, a lesser amount of windshield washer fluid may be dispensed onto windshield 12.

Additionally, the speed of pump 26 may be varied depending upon the speed of the vehicle. For example, the vehicle may include a speed sensor 50 which may be operatively connected to controller 24. Controller 24 may then determine or control the speed of pump 26 based upon the input controller 24 receives from speed sensor 50. In such a situation, pump 26 may disperse more windshield washer fluid, or run at a higher speed, when speed sensor 50 senses a relatively high vehicle speed and disperse less windshield washer fluid, or run for at a low speed, when speed sensor 50 senses a relatively low vehicle speed, or vice versa.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

What is claimed:

1. A windshield washer system comprising:
a controller having multiple operating modes;
a wiper device operatively connected to the controller and disposed on or in proximity to a windshield;
a motor operatively connected to the controller and the wiper device;
a pump in communication with a timer for determining the duration of pumping and selectively operated by the controller in accordance with the multiple operating modes, wherein the timer is programmed with a different pump duration for each of the multiple operating modes; and
a sprayer operatively connected to the pump for dispensing a select or predetermined amount of fluid on said windshield.

2. The windshield washer system according to claim 1, wherein the multiple operating modes include a manual mode, a cycle mode or an automatic operating mode.

3. The windshield washer system according to claim 1, wherein an automatic operating mode is activated by a sensor disposed on or in proximity to the windshield.

4. The windshield washer system according to claim 1, wherein the timer operates the pump for a select or predetermined time.

5. The windshield washer system according to claim 4, wherein the select or predetermined time comprises a select or predetermined number of seconds or portions of seconds.

6. The windshield washer system according to claim 5, wherein the select or predetermined time comprises a select or predetermined number of cycles of the wiper device.

7. The windshield washer system according to claim 5, wherein the timer determines the select or predetermined amount of windshield washer fluid dispensed from a sprayer.

8. A windshield washer system comprising:
a controller having multiple operating modes;
a timer for determining different pumping durations for each of the multiple operating modes;
a means for activating the controller to initiate an automatic operating mode;
a wiper device operatively connected to the controller and disposed on or in proximity to a windshield;
a motor operatively connected to the controller and the wiper device;
a pump that receives a signal or input associated with the timer for determining the duration of pumping and that is selectively operated by the controller; and
a sprayer operatively connected to the pump for dispensing a select or predetermined amount of fluid on said windshield.

9. The windshield washer system according to claim 8, wherein the means for initiating the automatic operating mode includes a sensor disposed on or in proximity to the windshield.

10. The windshield washer system according to claim 8, wherein the timer operates the pump for a select or predetermined time.

11. The windshield washer system according to claim 8, wherein the select or predetermined time comprises a select or predetermined number of seconds or portions of seconds.

12. The windshield washer system according to claim 8, wherein the select or predetermined time comprises a select or predetermined number of cycles of the wiper device.

13. The windshield washer system according to claim 8, further including a speed sensor, wherein the controller is capable of receiving a signal or an input from the speed sensor and adjusting the speed of the pump based upon the signal or input.

\* \* \* \* \*